United States Patent
Ohtomo et al.

[11] Patent Number: 6,093,928
[45] Date of Patent: Jul. 25, 2000

[54] POSITION MEASURING ROTARY INCREMENTAL OPTICAL ENCODER

[76] Inventors: Fumio Ohtomo; Kunihiro Hayashi; Kazuki Osaragi, all of c/o Kabushiki Kaisha Topcon 75-1, Hasunuma-Cho, Itabashi-Ku, Tokyo, Japan, 174

[21] Appl. No.: 09/016,589

[22] Filed: Jan. 30, 1998

Related U.S. Application Data

[63] Continuation-in-part of application No. 08/576,231, Dec. 21, 1995, abandoned.

[30] Foreign Application Priority Data

Dec. 22, 1994 [JP] Japan ..................................... 6-336268

[51] Int. Cl.⁷ ....................................................... G01D 5/34
[52] U.S. Cl. ............................... 250/231.13; 250/231.18; 33/707
[58] Field of Search ......................... 250/231.13, 231.14, 250/231.16, 231.17, 231.18, 237 G; 33/706, 707; 356/373, 374, 375

[56] References Cited

U.S. PATENT DOCUMENTS

| | | | |
|---|---|---|---|
| 4,793,067 | 12/1988 | Reimar et al. | 33/707 |
| 5,129,725 | 7/1992 | Ishizuka et al. | 250/231.14 |
| 5,171,982 | 12/1992 | Kronenberg | 250/231.13 |

*Primary Examiner*—Seungsook Ham
*Assistant Examiner*—Kevin Pyo
*Attorney, Agent, or Firm*—Baker Botts L.L.P.

[57] ABSTRACT

An incremental encoder has a rotor provided with a plurality of indices and is capable of detecting a reference point or a zero point without turning the rotor one full turn. Graduation lines of a main scale are counted until a detector detects an index $I_1$ and the next index $I_2$, the angle or the distance between the reference point and the index $I_2$ is determined on the basis of the counted number of graduation lines of the main scale, the angle or the distance between the position of the index $I_2$ and an optional position is determined on the basis of the corresponding number of graduation lines of the main scale, and the angle or the distance between the reference point and the optional position is determined by adding the angle or the distance between the reference point and the position of the index $I_2$ to the angle of the distance between the position of the index $I_2$ and the optional position.

3 Claims, 11 Drawing Sheets

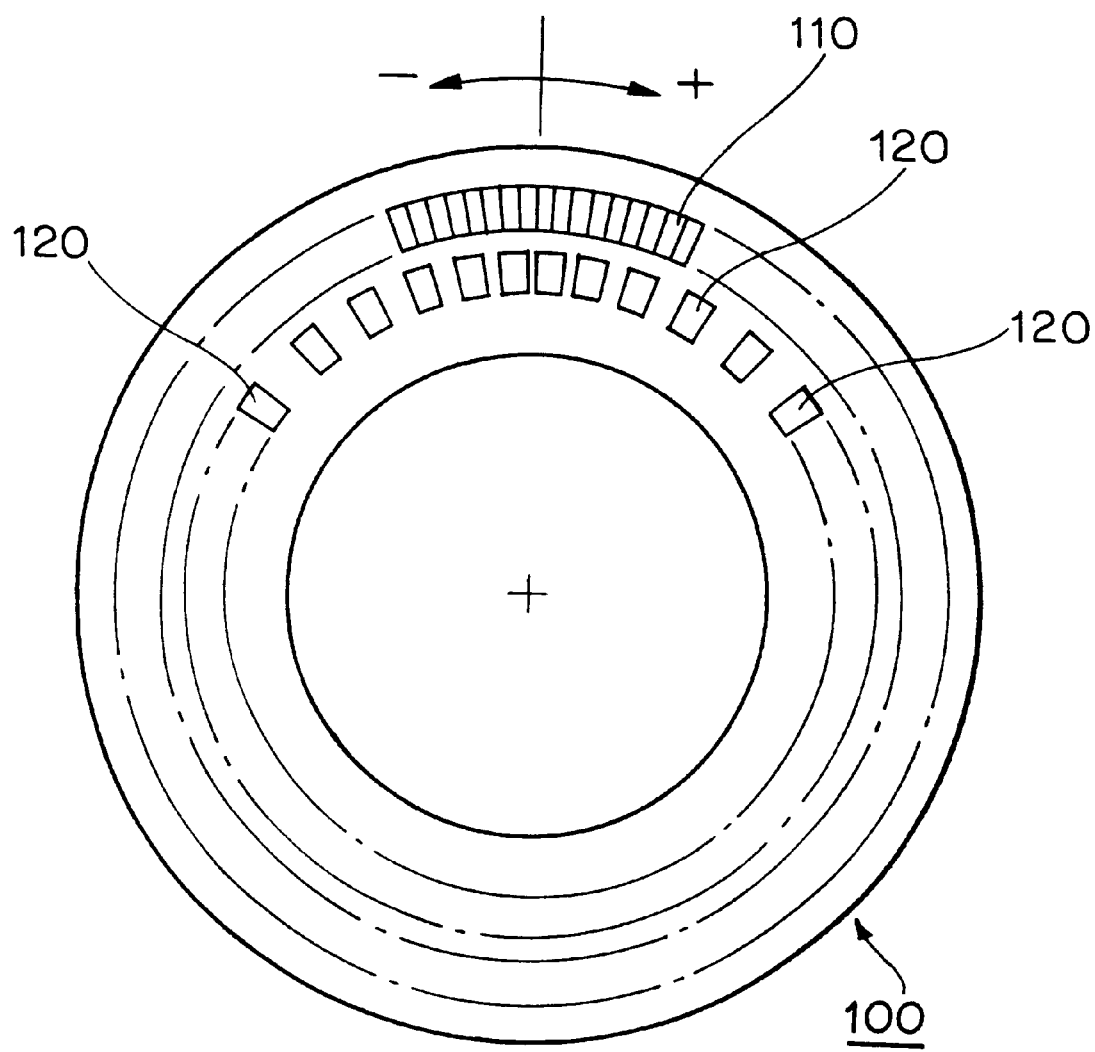

FIG. 10

| N | angle from zero signal portion (N=0) to zero signal reference line | number of pitches L from reference (main signal) | number of pitch difference from neighboring (main signal) | angle from zero signal reference line to the zero signal reference line of neighboring zero signal portion |
|---|---|---|---|---|
| -30 | -176° 00′ 00″ | -3960 | | |
| -29 | -167° 33′ 20″ | -3770 | 190 | 8° 26′ 40″ |
| ...... | ...... | ...... | 186 | 8° 16′ 00″ |
| -3 | -10° 24′ 00″ | -234 | 86 | 3° 49′ 20″ |
| -2 | -6° 45′ 20″ | -152 | 82 | 3° 38′ 40″ |
| -1 | -3° 17′ 20″ | -74 | 78 | 3° 28′ 00″ |
| 0 | 0° 00′ 00″ | 0 | 74 | 3° 17′ 20″ |
| 1 | 3° 12′ 00″ | 72 | 72 | 3° 12′ 00″ |
| 2 | 6° 34′ 40″ | 148 | 76 | 3° 22′ 40″ |
| 3 | 10° 08′ 00″ | 228 | 80 | 3° 33′ 20″ |
| ...... | ...... | ...... | 84 | 3° 44′ 00″ |
| 29 | 164° 58′ 40″ | 3712 | 184 | 8° 10′ 40″ |
| 30 | 173° 20′ 00″ | 3900 | 188 | 8° 21′ 20″ |

POSITION MEASURING ROTARY INCREMENTAL OPTICAL ENCODER

This is a continuation-in-part application based on application No. 08/576,231 filed Dec. 21, 1995 now abandoned, which is incorporated herein by reference.

BACKGROUND OF THE INVENTION

The present invention relates to an incremental encoder and, more particularly, to an incremental encoder having a rotor provided with a plurality of indices and capable of detecting a reference or zero point without turning the rotor one full turn.

Encoders have been widely used for electrically measuring distances and angles. Optical encoders and magnetic encoders are quite analogous in basic configuration.

Rotary encoders have been prevalently used for the electrical measurement of angles. In particular, optical encoders incorporate advanced optical techniques, they are capable of measurement with high accuracy and high resolution, they have high resolving power and are immune to disturbances such as external magnetism, and they have a long lifetime owing to their noncontact measuring operation.

Optical encoders having such exemplary features are used in surveying instruments for measuring angles, for example.

Optical encoders employed in current surveying instruments are classified into those of absolute type, i.e., absolute optical encoders, and those of incremental type, i.e., incremental optical encoders.

In an absolute optical encoder, angle and position on a circumference are in one-to-one correspondence, and positions on a circumference are registered as absolute addresses. Therefore, position information about any position can be obtained. However, an absolute optical encoder has a complex construction, and it is very difficult to construct an absolute optical encoder in a compact, lightweight manner for a surveying instrument.

As shown in FIG. 6, an incremental optical encoder comprises a rotor 9100 provided with a main scale 9110, a stator 9200 provided with a subscale 9210, and a detecting means having components 9310, 9320 and 9330. The main scale 9110 formed on the rotor 9100 has graduation lines arranged at equal angular pitch, e.g. of 80 sec, at the periphery of the rotor 9100 in an occulting pattern. The subscale 9210 formed on the stator 9200 has graduation lines arranged at an angular pitch equal to that of the main scale 9110 in an occulting pattern.

The detecting means comprises an LED (light emitting diode) 9310, a collimator lens 9320 and a photosensor 9330. The LED 9310 and the photosensor 9330 are disposed with the rotor 9100 and the stator 9200 therebetween. When the rotor 9100 rotates, the light emitted by the LED 9310 is interrupted once every time the rotor 9100 turns through an angle corresponding to one graduation of the main scale 9110, and the photosensor 9330 provides an electric signal indicating the interruption of the light. The electric signals provided by the photosensor 9330 are counted to detect the angle through which the rotor 9100 has turned.

The incremental optical encoder is able to start counting the output signals of the photosensor 9330 from any position of the rotor 9100 and to measure the angle of turn of the rotor 9100 from the position where counting the output signals of the photosensor 9330 is started.

A surveying instrument employing an incremental optical encoder will be described with reference to FIGS. 7(a) and 7(b). A surveying instrument 10000 comprises a base unit 8100, a standard unit 8200 rotatably mounted on the base unit 8100 in a horizontal plane, a sighting telescope 8300 supported on the standard unit 8200 for turning in a vertical plane, a first detector 8400 for detecting the horizontal angle of the standard unit 8200, and a second detector 8500 for detecting the elevation angle of the sight line of the telescope 8300.

The base unit 8100 is connected by leveling screws 8160 to a leveling plate 8150 to be fixedly mounted on a tripod or the like. The level of the surveying instrument 10000 can be adjusted by turning the leveling screws 8160. The base unit 8100 is provided with a lower adjusting knob 8120 and a lower clamp knob 8130 to adjust and fix the base unit 8100. The standard unit 8200 is provided with an upper adjusting knob 8220 and an upper clamp knob 8230 to adjust and fix the standard unit 8200. The sighting telescope 8300 is provided with an elevation adjusting knob 8320 and an elevation clamp knob 8330 to adjust the elevation angle in the sighting direction of the sighting telescope 8300 and to fix the sighting telescope 8300 in an adjusted sighting direction.

An optical encoder included in the second detector 8500 detects the elevation angle of the sighting direction of the sighting telescope 8300 with respect to zenith, for example. The optical encoder of the second detector 8500 is provided with an index for zero detection to determine an angle from a reference. The signals are counted using the index as a reference or zero point to measure the angle. An optical encoder included in the first detector 8400 for measuring the horizontal angle of the standard unit 8200 has no particular reference direction and hence does not need any reference point. Therefore, the optical encoder is an ordinary one not provided with any index.

The incremental optical encoder provided with an index of the second detector 8500 will be described with reference to FIG. 8. The incremental optical encoder of the second detector 8500 comprises a rotor 8510, a stator 8520, and an optical detector comprising components 8531–8533 and 8535–8537 disposed with the rotor 8510 and the stator 8520 there between as shown. The rotor 8510 is provided at its periphery with a main scale 8511 having graduation lines formed at equal angular pitch, and a zero detection index 8512. The stator 8520 is provided with a first subscale 8521 for use in combination with the main scale 8511, and a second subscale 8522 for use in combination with the zero detecting index 8512. The optical detector 8530 comprises an index detecting unit and a main scale detecting unit. The index detecting unit comprises a first light emitting device 8531, a first collimator lens 8532 and a first photosensor 8533 and is capable of detecting the zero detecting index 8512 of the rotor 8510. The main scale detecting unit comprises a second light emitting device 8536, a second collimator lens 8535 and a second photosensor 8537. The main scale detecting unit detects light pulses produced by the occulting pattern of the main scale 8511 of the rotor 8510, and the second photosensor 8537 converts the light pulses into corresponding electric signals. The electric signals are counted to determine an angle from a zero detection point.

A method of using the conventional surveying instrument 10000 thus constructed will be described. The leveling plate 8150 of the surveying instrument 10000 is mounted on a tripod, and the leveling plate 8150 is leveled by turning the leveling screws 8160. Then, a main switch is closed and the sighting telescope 8300 is turned one full turn to complete preparations. When the sighting telescope 8300 is turned, the rotor 8510 of the second detector 8500 is turned, and the zero detecting index 8512 sets a zero point to measure an angle from the zero point.

This conventional surveying instrument 10000 needs to turn by one full turn the sighting telescope 8300 provided with the second detector 8500 including the incremental optical encoder provided with the index; that is, the zero detecting index 8512 of the rotor 8510 must be detected by the index detecting unit of the optical detector 8530 by turning the sighting telescope 8300 one full turn. The sighting telescope 8300 needs to be turned by one full turn because the index 8512, in general, is invisible from outside. If the sighting telescope 8300 is turned quickly, the index detecting unit of the optical detector 8530 is unable to detect the zero detecting index 8512 of the rotor 8510 and hence measurement cannot be made. Accordingly, the sighting telescope 8300 must be turned at an appropriate turning speed below a certain turning speed, with the appropriate turning speed unavoidably being dependent on user intuition, which is very burdensome.

SUMMARY OF THE INVENTION

It is therefor an object of the present invention to provide an incremental encoder having a plurality of indices and capable of detecting a reference or zero point without turning the rotor one full turn.

According to one aspect of the present invention, there is provided an incremental encoder comprising: a rotor provided with a main scale; a stator provided with a first subscale; and a detecting means comprising a light source unit, an optical system, and a light-receiving unit disposed with the rotor and the stator there between;

the rotor being provided with a plurality of indices for detecting a reference point, the stator being provided with a second subscale for use in combination with the indices.

According to another aspect of the present invention, there is provided an incremental encoder wherein the detecting means detects a specific index $I_1$, the graduation lines of the main scale are counted until the detecting means detects the next index $I_2$, a set reference point is determined by calculation on the basis of the counted number of graduation lines of the main scale, the angle or the distance between the reference point and the position of the index $I_1$ is determined, the angle or the distance between the index $I_2$ and an optional position is determined on the basis of the corresponding number graduation lines of the main scale, and the angle or the distance between the reference point and the optional position is determined by adding the angle or the distance between the reference point and the position of the index $I_2$ to the angle or the distance between the index $I_2$ and the optional position.

BRIEF DESCRIPTION OF THE DRAWINGS

FIG. 3(*b*) is a block diagram of assistance in explaining the electrical configuration of the incremental encoder 1000 of FIG. 1.

FIG. 9 is a plan view of another rotor 100 that can be included in the incremental encoder 1000.

FIG. 10 is a table of graduations as an example for the rotor of FIG. 9.

DETAILED DESCRIPTION

Figure 1:
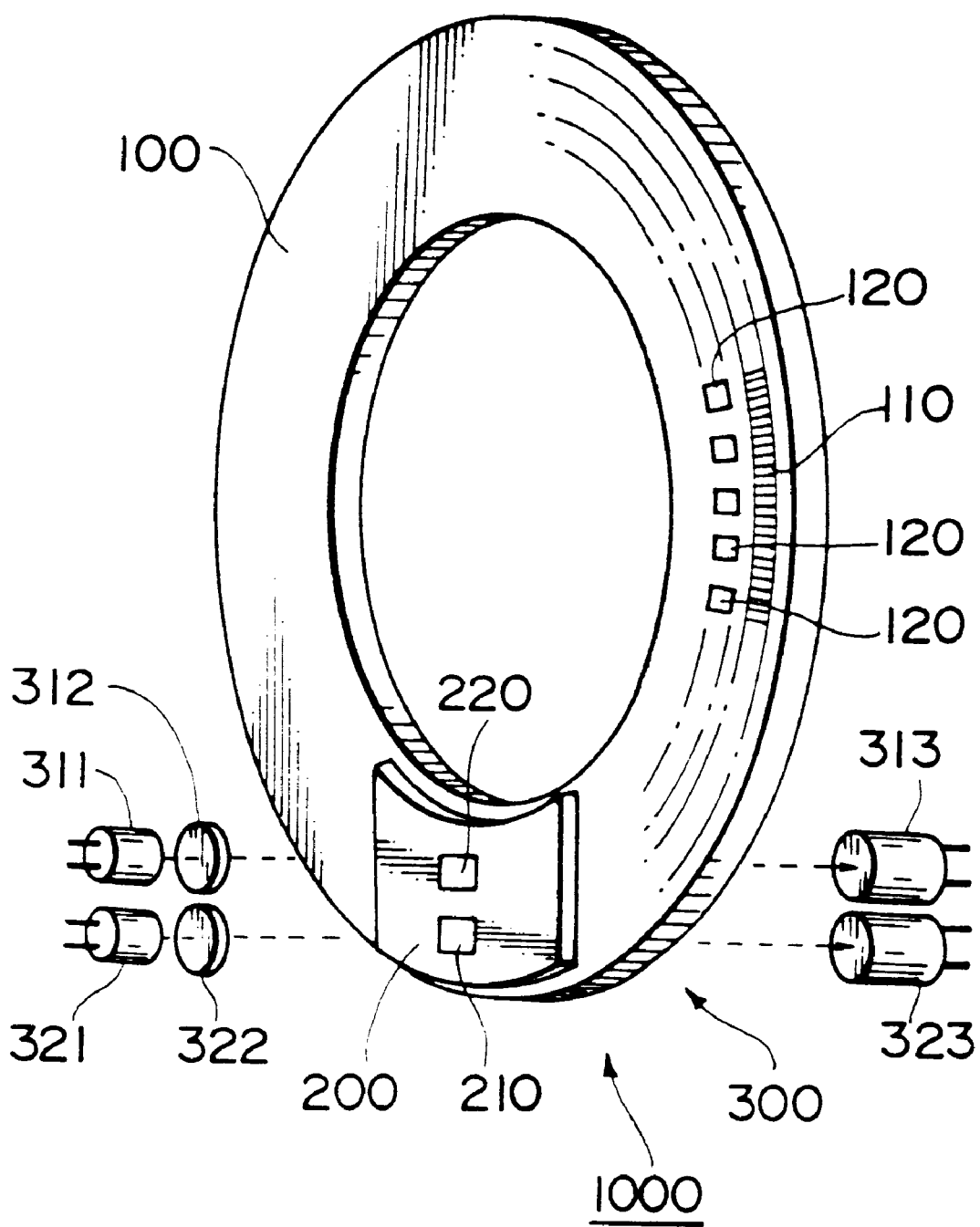
FIG. 1 is a perspective view of an incremental encoder 1000 in a preferred embodiment according to the present invention.

Referring to FIG. 1, an incremental encoder 1000 in a preferred embodiment according to the present invention comprises a rotor 100, a stator 200, and an optical detector 300 having components disposed with the rotor 100 and the stator 200 therebetween. The rotor 100 is provided at its periphery with a main scale 110 having graduation lines formed at equal angular pitch, and a plurality of zero detecting indices 120. The stator 200 is provided with a first subscale 210 for use in combination with the main scale 110, and a second subscale 220 for use in combination with the zero detecting indices 120. The optical detector 300, i.e., a detecting means, comprises an index detecting unit 310 and a main scale detecting unit 320. The index detecting unit 310, which is capable of detecting the zero detecting indices 120, comprises a first light emitting device 311, a first collimator lens 312 and a first photosensor 313. The main scale detecting unit 320 comprises a second light emitting device 321, a second collimator lens 322 and a second photosensor 323. The main scale detecting unit 320 detects light pulses produced by the occulting pattern of the main scale 110, with the second photosensor 323 converting the light pulses into corresponding electric signals. The electric signals provided by the second photosensor 323 are counted to detect an angle from a zero detection point. The first light emitting device 311 and the second light emitting device 321 may be light emitting devices of any type, such as LEDs. The first photosensor 313 and the second photosensor 323 may be photosensors of any type which is capable of photoelectric conversion.

Figure 2:
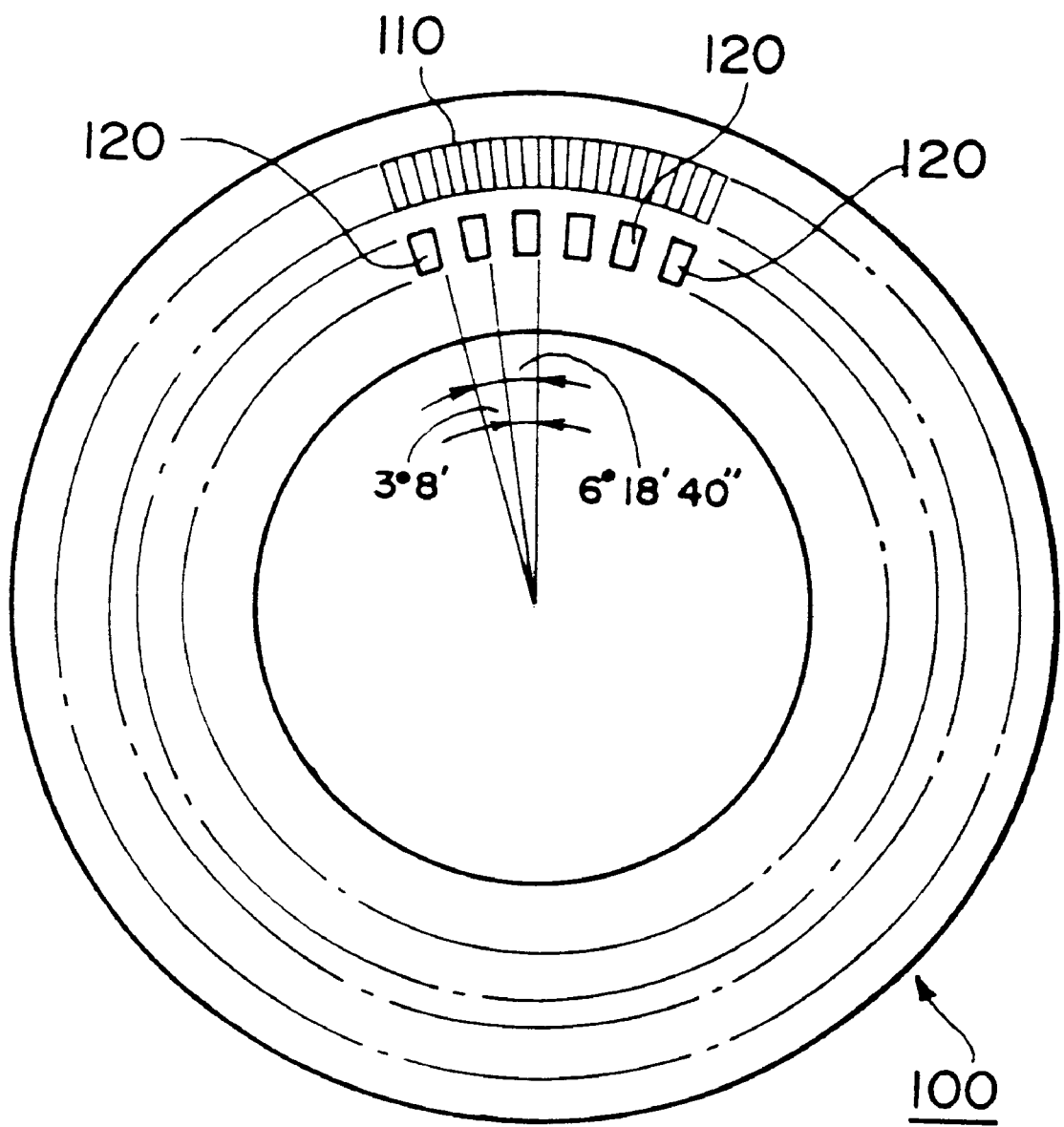
FIG. 2 is a plan view of a rotor 100 included in the incremental encoder 1000.

The main scale 110 and the zero detecting indices 120 of the rotor 100 will be described with reference to FIG. 2. The main scale 110 is an occulting pattern of graduation lines formed at equal angular pitch at the periphery of the rotor 100. The zero detecting indices 120 are formed at the periphery of the rotor 100 at different angular pitch so that different numbers of graduation lines of the main scale 110 correspond to respective angular distances between the adjacent indices 120. For example, if there are indices $I_1$, $I_2$, ... and the position of index $I_N$ is expressed by $$I_N = 3°8'0" \times N + 2'40" \times (N-1)$$

then the respective positions of the indices $I_1$ and $I_2$ are at 3°8'0" and 6°18'40", respectively.

Such different respective angular distances between the zero detecting indices 120 thus arranged increase in a specific direction.

FIG. 9 illustrates a preferred embodiment of the invention having different zero detecting indices 120 on the rotor 100 for the two directions of rotation. In clockwise and counterclockwise directions, from the zero point, the indices 120 have different angular distances. Thus, the number of graduation lines of the main scale 110 corresponding to the indices 120 differs, and differs also between clockwise (N=1, 2, . . . ) and counterclockwise (N=−1, −2, . . . ) directions. For example, if clockwise: $I_N = 3°12'0" \times N + 5'20" \times N(N-1)$ counterclockwise: $I_N=3°12'0"\times N-5'20"\times N^2$
then
$I_1=3°12'0"$
$I_2=6°34'40"$
$I_{-1}=-3°17'20"$
$I_{-2}=-6°45'20"$
so that index spacing increases differently clockwise and counterclockwise along each respective arc such as a semicircle, for example. The direction of rotation is determined and zero position is measured accordingly.

Another example is shown as FIG. 10.

Figure 3:
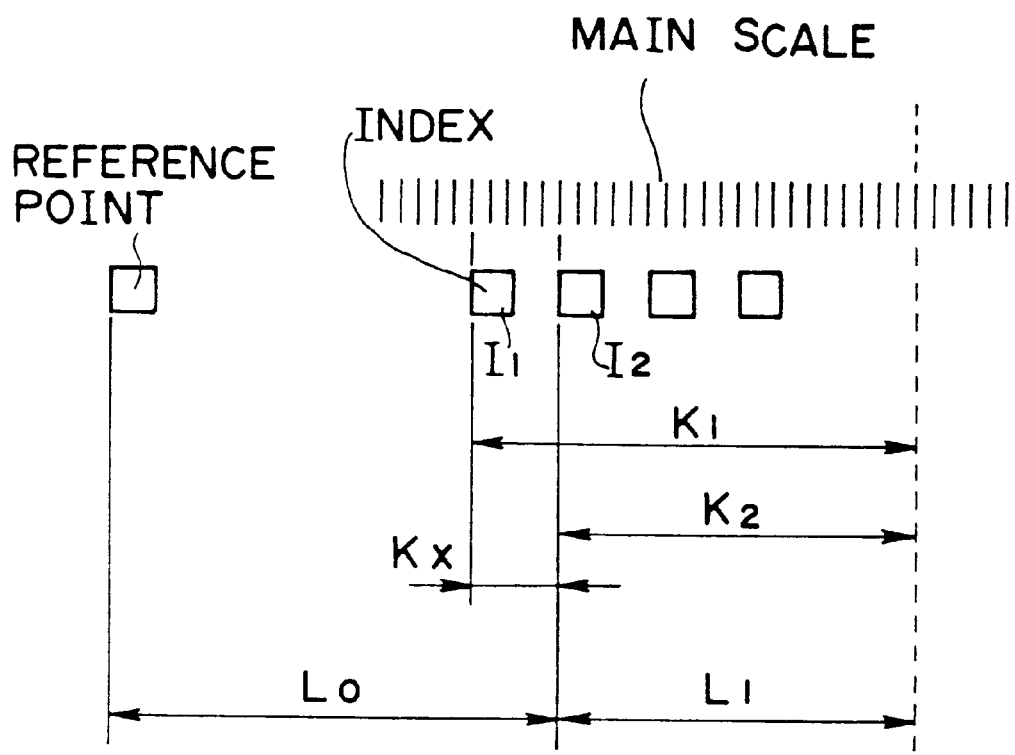
FIG. 3(*a*) is a diagram of assistance in explaining the principle of the present invention.

Referring to FIG. 3(a), suppose that $K_1$ is the number of the graduation lines of the main scale 110 between the position of the index $I_1$ and an optional position, and $K_2$ is the number of the graduation lines of the main scale 110 between the position of the index $I_2$ and the same optional position. Then, the number $K_1$ is subtracted from the number $K_2$, and $K_x=|K_2-K_1|$ is the number of graduation lines between the respective positions of the indices $I_1$ and $I_2$. Since angular distance between the indices 120 increases in the specific direction, the distance $L_0$ between a reference point (zero point) and the position of the index $I_2$ can be determined by using the number $K_x$; that is, the number $K_x$ and the distance between the reference point (zero point) and the index 120 are in a one-to-one correspondence. The distance $L_1$ between the position of the index $I_2$ and the optional position can be known from the number $K_2$. The distance between the reference point (zero point) and the optional position is $L_0+L_1$, i.e., the sum of the distance $L_0$ between the reference point (zero point) and the position of the index $I_2$, and the distance $L_1$ between the position of the index $I_2$ and the optional position.

The present invention is applicable to determining a linear distance by linearly arranging the indices and to a rotary encoder for detecting an angle by arranging the indices in a circle.

In this specification, the specific index $I_1$ is determined at discretion, and the next index $I_2$ may be an index immediately behind the index $I_1$ or an index several graduations behind the index $I_1$. Accordingly, the present invention enables the measurement of distance or angle from any position.

Figure 3B:
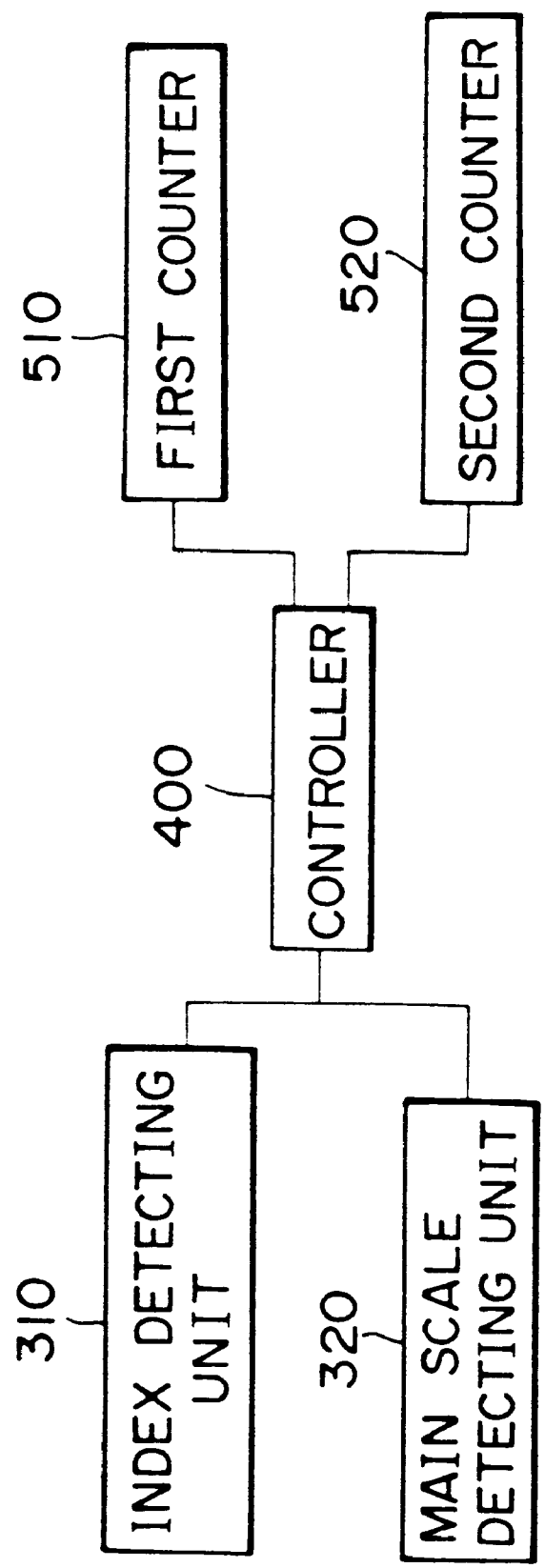

Referring to FIG. 3(b), the incremental encoder 1000 has the index detecting unit 310, the main scale detecting unit 320, a controller 400, a first counter 510 and a second counter 520.

The operation of the incremental encoder 1000 will be described with reference to FIG. 4. The incremental encoder 1000 is connected to a power supply to start angle measurement in step S1, the first counter 510 is cleared in step S2, and then the rotor 100 is turned in step S3. In step S4, a query is made to see whether the index detecting unit 310 has detected the first index $I_1$. Step S5 is executed when the response in step S4 is affirmative, i.e., if the first index $I_1$ has been detected, or step S4 is repeated when the response in step S4 is negative, i.e., if the first index $I_1$ has not been detected. In step S5, the first counter 510 starts counting pulse signals provided by the main scale detecting unit 320 and representing light pulses produced by the occulting pattern, and the second counter 520 is cleared in step S6.

In step S7, a query is made to see whether the index detecting unit 310 has detected the second index $I_2$. Step S8 is executed when the response in step S7 is affirmative, i.e., if the second index $I_2$ has been detected, or step S7 is repeated when the response in step S7 is negative, i.e., if the second index $I_2$ has not been detected. In step S8, the second counter 520 starts counting pulse signals provided by the main scale detecting unit 320 and representing light pulses produced by the occulting pattern and the counting operation of the second counter 520 is continued to an optional position.

In step S9, the controller 400 calculates the difference between the respective counts of the first counter 510 and the second counter 520 to calculate or call an angle between the zero point and the position of the index $I_2$ corresponding to the calculated difference between the counts. The controller 400 calculates the angle between the position of the index $I_2$ and an optional position on the basis of the count indicating the position of the index $I_2$. The angle between the zero point and the optional point can be determined by adding the angle between the position of the index $I_2$ and the optional position, and the angle between the zero point and the position of the index $I_2$. The first counter 510 and the second counter 520 may be cleared upon the connection of the incremental encoder 1000 to the power supply.

Figure 5:
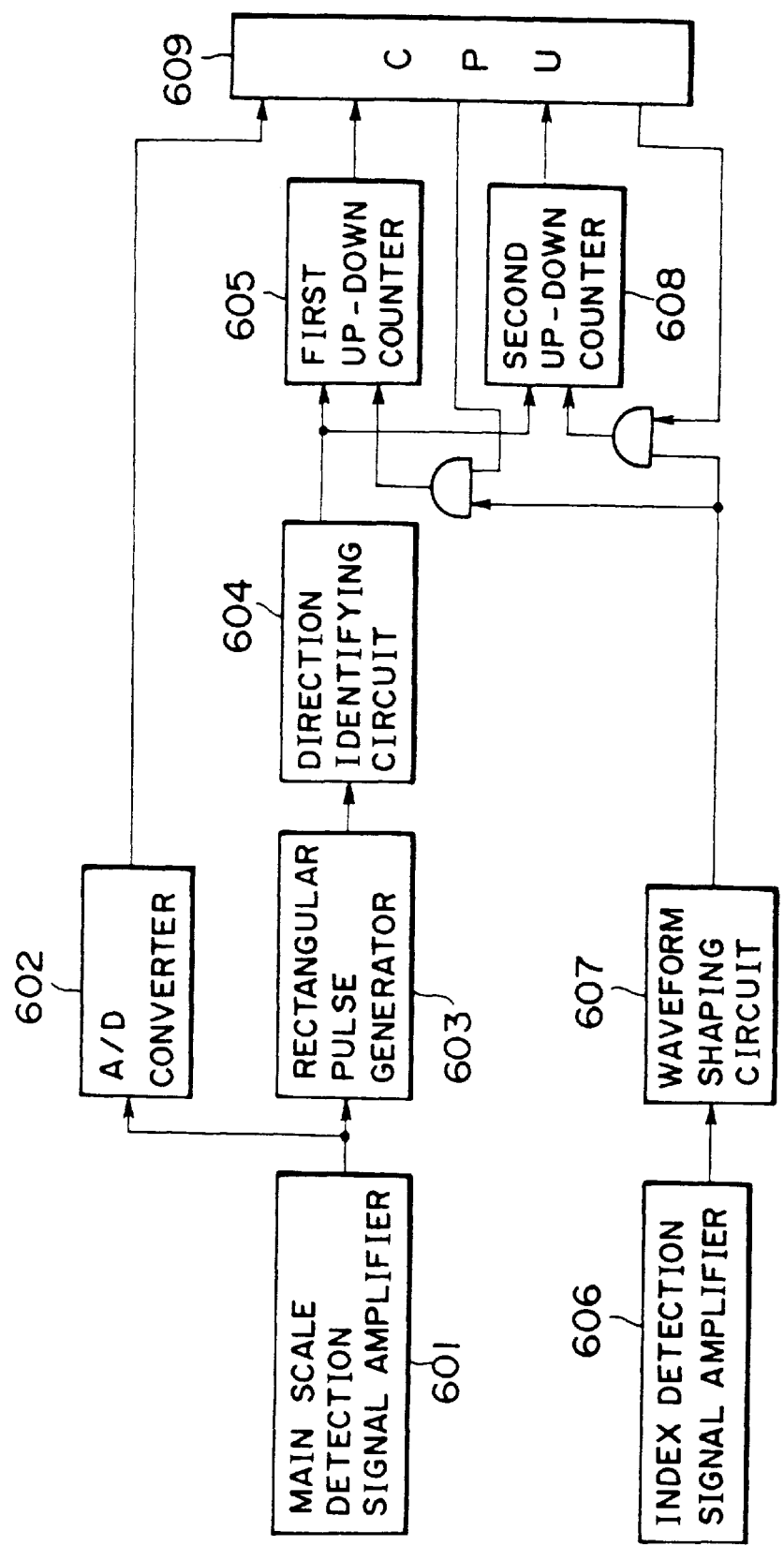
FIG. 5 is a block diagram of an electronic circuit included in the incremental encoder 1000 of FIG. 1.
Figure 6:
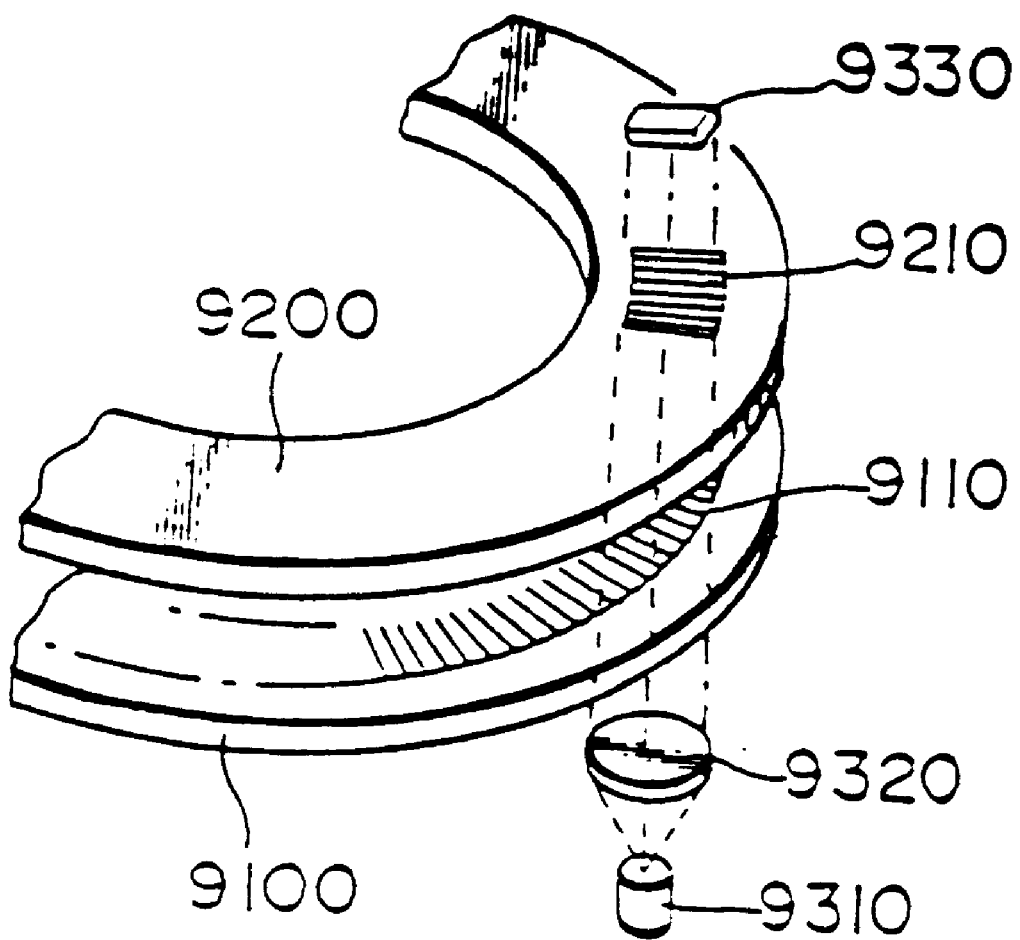
FIGS. 6, 7(*a*), 7(*b*) and 8 are views of assistance in explaining a conventional surveying instrument.
Figure 7B:
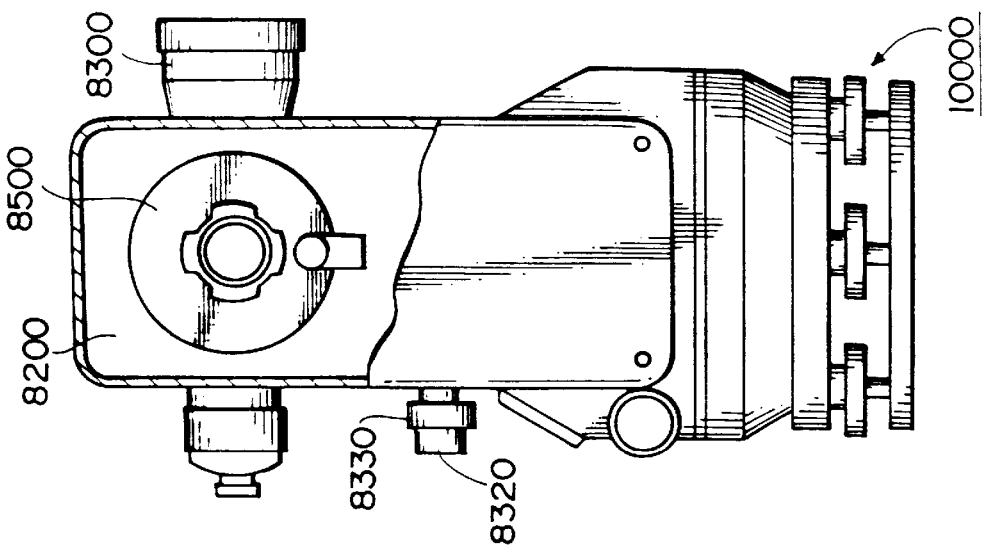
Figure 7A:
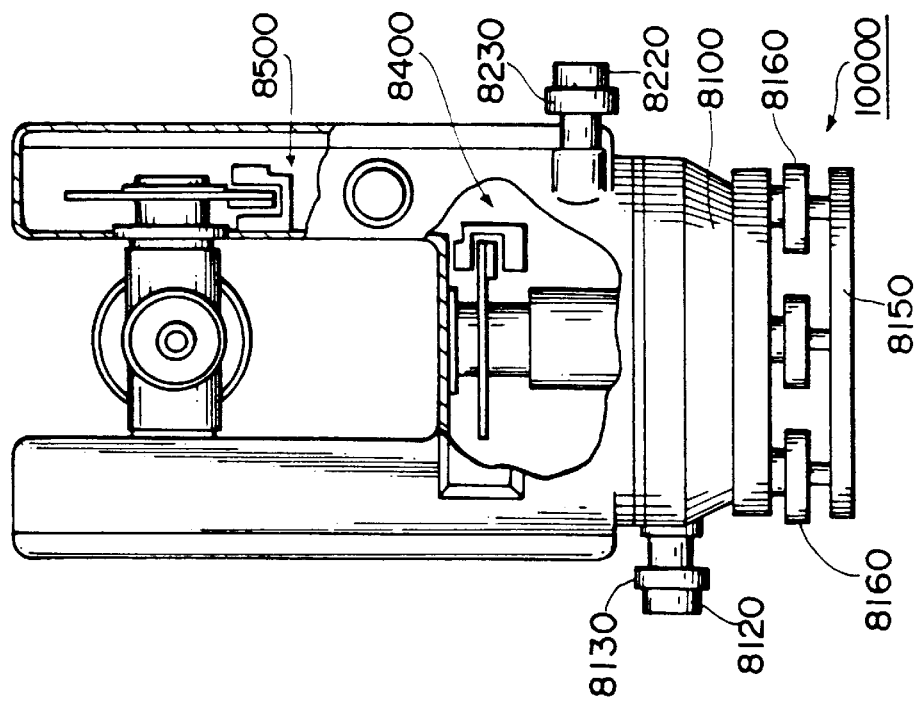
Figure 8:
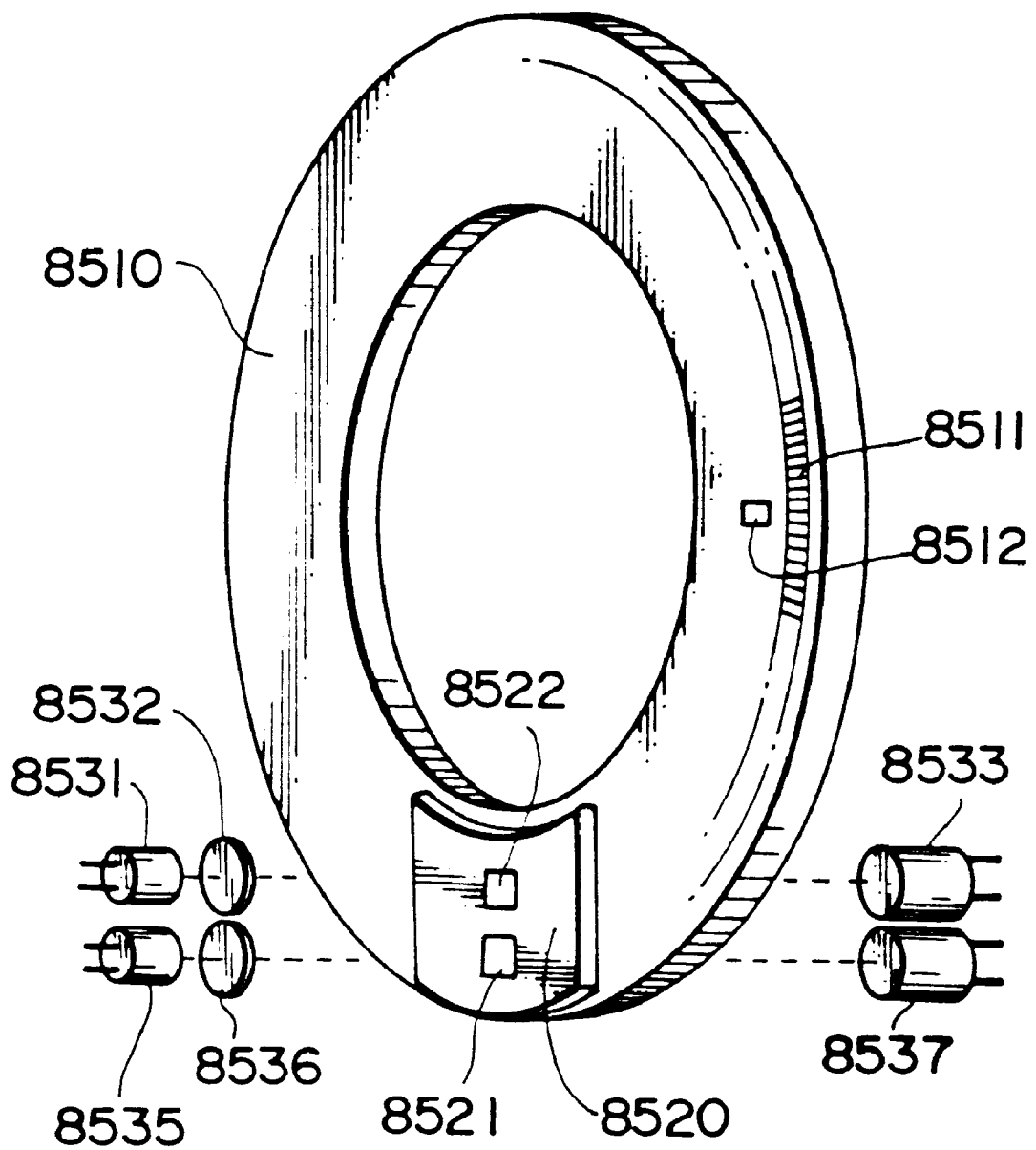

The electrical configuration of an electronic circuit included in the incremental encoder 1000 will be described with reference to FIG. 5 by way of example. The electronic circuit comprises a main scale detection signal amplifier 601, an A/D converter 602, a rectangular pulse generator 603, a direction identifying circuit 604, a first up-down counter 605, an index detection signal amplifier 606, a waveform shaping circuit 607, a second up-down counter 608, and a CPU 609.

The main scale detection signal amplifier 601 amplifies electric signals provided by the second photosensor 323. The A/D converter 602 converts the output signals of the main scale detection signal amplifier 601 into corresponding digital signals and gives the same to the CPU 609. The first up-down counter 605 corresponds to the first counter 510, and the second up-down counter 608 corresponds to the second counter 520. The direction identifying circuit 604 identifies the directions of rotation or the direction of increase or decrease. The index detection signal amplifier 606 amplifies electric signals provided by the first photosensor 313.

The output signal of the main scale detection signal amplifier 601 is given to the A/D converter 602 and the rectangular pulse generator 603. The output signal of the main scale detection signal amplifier 601 is given to the A/D converter 602 as a signal for interpolation and to the rectangular pulse generator 603 as a count signal. The rectangular pulse generator 603 generates a count signal of rectangular pulses, the direction identifying circuit 604 identifies the direction of rotation or the direction of increase or decrease, and the output signal of the direction identifying circuit 604 is given to the first up-down counter 605 and the second up-down counter 608. The digital output signal for interpolation provided by the A/D converter 602 is given as an interpolation data to the CPU 609.

The waveform of the output signal of the index detection signal amplifier 606 is shaped by the waveform shaping circuit 607, and the output signal of the waveform shaping circuit 607 is given as a start signal to the first up-down counter 605 and the second up-down counter 608. The start signal is given to the first up-down counter 605 only when a control signal provided by the CPU 609 is ON. Similarly, the start signal is given to the second up-down counter 608 only when the control signal provided by the CPU 609 is ON. When the start signal is given to the first up-down counter 605 and the second up-down counter 608 with the control signal provided by turning on the CPU 609, the up-down counters 605 and 608 start counting operation.

The first up-down counter 605 is cleared upon the connection of the incremental encoder 1000 to the power supply, and the first up-down counter 605 starts counting operation when the first start signal is given thereto with the control signal provided by the CPU 609 ON. When a count start signal is given to the CPU 609, the control signal given to the first up-down counter 605 goes OFF and the control signal given to the second up-down counter 608 goes ON. When the next index is detected, a start signal is given to the second up-down counter 608 to make the second up-down counter 608 start counting operation.

Figure 4:
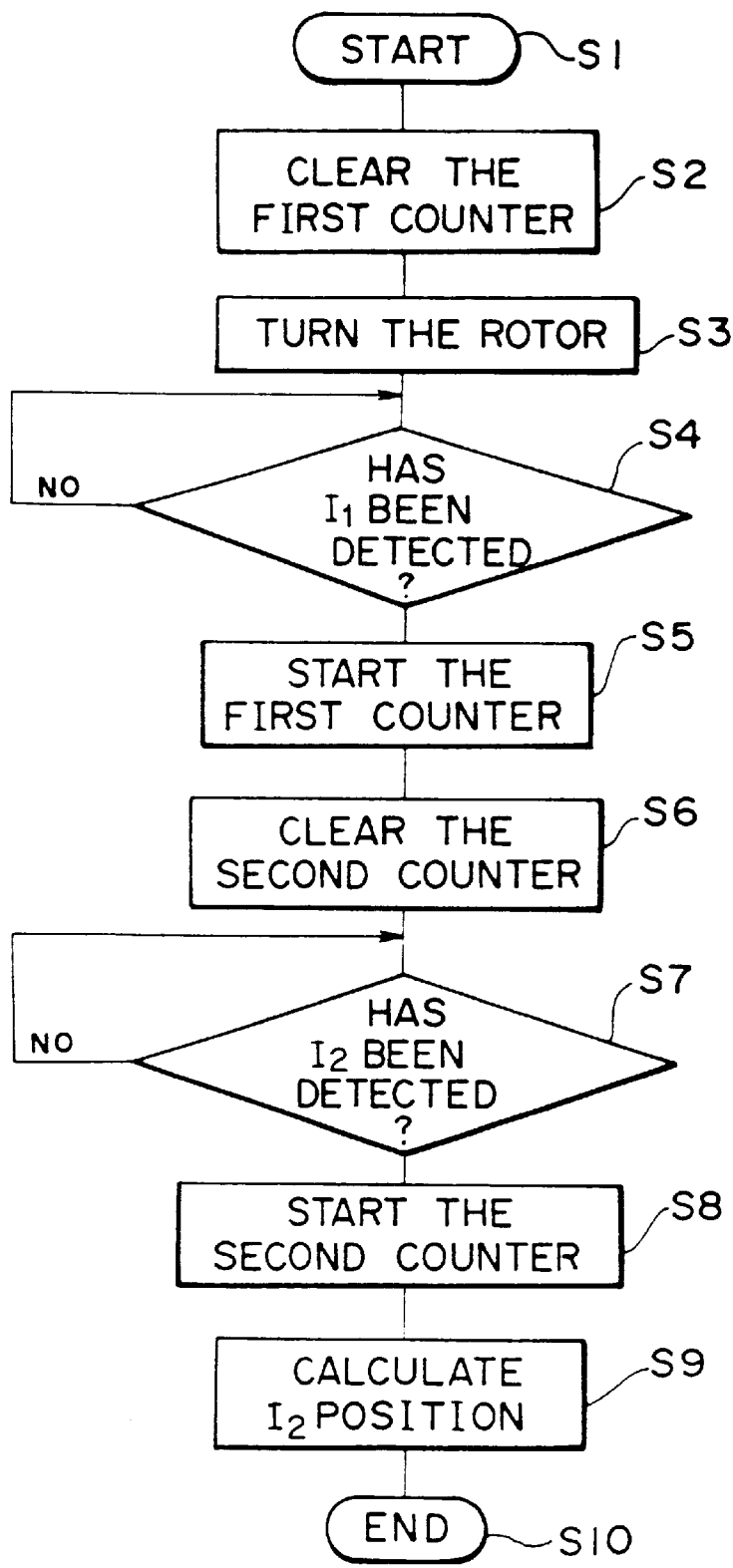
FIG. 4 is a flow chart of assistance in explaining the operation of the incremental encoder 1000 of FIG. 1.

This electronic circuit is capable of carrying out the operation shown in FIG. 4. The rest of the techniques and their application to surveying instruments are the same as the conventional techniques and hence the description thereof will be omitted.

As is apparent from the foregoing description, according to the present invention, the rotor is provided with the main scale, the stator is provided with the first subscale, the light source unit, the optical system and the light-receiving unit of the detecting means are disposed with the rotor and the stator there between, the indices for detecting the reference position are formed on the rotor, and the second subscale for indexing is formed on the stator. Therefore, the rotor need not be turned one full turn for the detection of the zero point, and the zero point can be detected by turning the rotor through a small angle to start angle measurement.

The indices may be formed at different pitch. The indices may be formed at different angular distances increasing in a specific direction.

The detecting means detects the specific index $I_1$ and counts the graduation lines of the main scale until the next index $I_2$ is detected, the reference point is determined by calculation on the basis of the counted number of the graduation lines of the main scale, and the angle or the distance between the reference point and the position of the index $I_2$ can be determined.

The detecting means detects the specific index $I_1$ and counts the graduation lines of the main scale until the next index $I_2$ is detected, the reference point is determined by calculation on the basis of the counted number of the graduation lines of the main scale, the angle or the distance between the reference point and the position of the index $I_2$ is determined, the angle or the distance between the position of the index $I_2$ and an optional position is determined on the basis of the corresponding number of graduation lines of the main scale, and the angle or the distance between the reference point and the optional position can be determined by adding the angle or the distance between the reference point and the index $I_2$ to the angle or the distance between the position of the index $I_2$ and the optional point.

Naturally, the present invention is applicable to magnetic encoders, rotary encoders and linear encoders.

Even if the sighting telescope of the surveying instrument incorporating the present invention is turned quickly and errors are introduced in angle calling, angle calling can be easily restarted simply by swinging the sighting telescope through a small angle in a vertical plane.

The incremental encoder of the present invention is small in size and is capable of high performance and of preventing the deterioration of the accuracy even if the incremental encoder is operated brusquely.

What is claimed is:

1. An incremental encoder comprising:
    a rotor having a peripherally disposed main scale and a plurality of circumferential indices;
    a stator having a first subscale disposed for optical communication with said main scale and a second subscale disposed for optical communication with said indices; and
    a detecting means comprising a light source unit and a light-receiving unit disposed with the rotor and the stator there between;
    wherein, from a zero reference point on the rotor, the indices are spaced according to a first relationship in a first direction and according to a different second relationship in an opposite second direction,
    wherein said first relationship and said second relationship are both chosen from the group comprising
        (a) relationships of consistently increasing interval; and
        (b) relationships of consistently decreasing interval;
    and wherein said first relationship and said second relationship are both the same with respect to whether they are consistently increasing or consistently decreasing;
    but wherein the magnitude of said intervals of said first relationship and said second relationship are not identical.

2. An incremental encoder according to claim 1, wherein the detecting means detects an index $I_1$, the main scale has graduation lines which are counted until the detecting means detects a next index $I_2$, the reference point is determined by calculation based on the counted number of graduation lines of the main scale, and an angle/distance between the reference point and position of the index $I_2$ is determined.

3. The incremental encoder according to claim 1, wherein the detecting means detects an index $I_1$, the main scale has graduation lines which are counted until the detecting means detects a next index $I_2$, the reference point is determined by calculation based on the counted number of graduation lines of the main scale, an angle/distance between the reference point and position of the index $I_2$ is determined, an angle/distance between the index $I_2$ and an optional position is determined based on a corresponding number of graduation lines of the main scale, and an angle/distance between the reference point and the optional position is determined by adding the angle/distance between the reference point and the position of the index $I_2$ to the angle or the distance between the index $I_2$ and the optional position.

* * * * *